United States Patent Office 2,920,948
Patented Jan. 12, 1960

2,920,948
EMULSIFIED MOTOR FUEL

Lloyd E. Weeks, Englewood, Ohio, assignor to Monsanto Chemical Company, St. Louis, Mo., a corporation of Delaware No Drawing. Application October 21, 1955
Serial No. 542,084

4 Claims. (Cl. 52—.5)

This invention relates to an improved motor fuel suitable for use in jet and reciprocating engines, especially for aircraft use and particularly relates to aqueous emulsions thereof.

An object of this invention is the provision of an improved motor fuel. Another object is the provision of an aqueous fuel which can be easily prepared utilizing water of various and sundry qualities and which when prepared is for all practical purposes perfectly stable in such form.

The use of water-emulsified motor fuel is, of course, well understood in the art. The preparation of such fuels, however, required relatively pure water, usually water which had been purified by removal of all or the major part of its contained hardness-forming salts. Unless these precautions were observed, the fuel emulsions formed therewith exhibited a pronounced tendency to separate into two phases, rendering such fuels unusable.

I have now discovered that if the hydrocarbon fuel, which is ordinarily used in aircraft engines, be emulsified with water employing an emulsifier such as is more particularly identified below, an emulsion is obtained which is for all practical purposes of a permanent nature. Moreover, the emulsion can be made by employing any quality of water available, provided, of course, that it is free of suspended solids, without the necessity of softening or otherwise treating said water.

The emulsifier which is employed in accordance with my invention is a polyethenoxy derivative of an alkylphenol in which at least 6 but not in excess of 9 ethenoxy ($-CH_2CH_2O-$) groups are combined with the said alkylphenol and wherein the alkyl radical attached to the phenol nucleus contains from 8 to 15 carbon atoms. The carbon atoms in said alkyl groups may be contained in one or two alkyl chains.

Within the limits defining the size of the alkyl chain and the related average number of ethenoxy groups the emulsion is exceptionally stable, whereas outside the stated limits there is exhibited greatly decreased stability.

The proportion of hydrocarbon fuel to water employed may vary over the limits of from 8% to 50% by weight of said hydrocarbon to 92% to 50% by weight of water. The amount of emulsifier added may vary from 0.5% to 5.0% by weight based on the weight of the hydrocarbon-water mixture with a range of emulsifier from 1.0 to 2.5% by weight being preferred.

The present emulsifiers are prepared by condensing ethylene oxide either in the liquid or gaseous form with the alkylphenol employing a small amount of sodium or potassium hydroxide as a catalyst during the condensation. A catalyst need not be used but is generally employed in order to decrease the reaction time. The reaction is carried out at a temperature of 100° to 110° C. The reaction is substantially quantitative and the passage of ethylene oxide into the alkylphenol is continued until the desired number of mols of ethylene oxide have combined with the alkylphenol. It will, of course, be realized that the product obtained by the reaction of ethylene oxide with the phenol consists of a mixture of compounds having somewhat varying amounts of condensed ethylene oxide in the product. It is not necessary to separate such mixtures into the pure components since the mixtures can be used directly as prepared. As pointed out above, the emulsifier can be used in the stated proportions if the ethenoxy content has an average composition within the range of 6 to 9 ethenoxy groups per alkylphenol radical contained therein.

The hydrocarbon motor fuel employed as one of the constituents of the present emulsion may be a paraffinic or naphthenic type hydrocarbon boiling in the motor fuel boiling range and is generally characterized by possessing an extremely low pour point. A typical hydrocarbon fuel of this type as used for jet engines is designated as JP-4 (Spec. Mil-F 5624A), consists of a low vapor pressure liquid made from a mixture of gasoline and kerosene.

Typical test data for a jet engine fuel are the following:

| | |
|---|---|
| 10% evaporated point, max. ° F. | 250 |
| End point, max. ° F. | 550 |
| Freezing point, max. ° F. | −76 |
| Specific gravity (60/60) max. | 0.825 |
| Specific gravity (60/60) min. | 0.747 |
| Aromatics, percent by vol., max. | 25.0 |
| Bromine No., max. | 30.0 |
| Heating value, B.t.u./lb. min. | 18,400 |

For reciprocating engines the conventional type aircraft gasoline may be employed. The water employed in the preparation of the present fuel emulsion need not be distilled or deionized or otherwise specifically purified and accordingly may contain the naturally occurring soluble salts such as the carbonates, chlorides and sulfates of calcium, magnesium and sodium.

The examples below illustrate some of the specific embodiments of the present invention.

Example 1

The present emulsified fuel is best prepared by first dissolving the alkylphenol-ethylene oxide product in the hydrocarbon component and then mixing such mixture with the desired amount of water. To this end and by way of example, 6.95 g. of a condensation product containing 7.2 mols of condensed ethylene oxide per mol of dodecylphenol was dissolved in 43 ml. (34 g.) of standard jet fuel. The emulsified fuel was then prepared by taking 18 ml. of hydrocarbon-emulsifier mixture and mixing the same with 82 ml. of water. Samples of emulsified fuel were prepared as above described utilizing water both of zero hardness and also water containing 1,000 p.p.m. hardness. In both cases complete emulsions were readily prepared utilizing a simple mixing procedure.

The samples of the emulsions prepared as above were placed in Nessler tubes and observed over a period of 24 hours. It was noted that no separation of phases occurred either in the fuel mixture made with water of zero hardness or with water of 1,000 p.p.m. hardness.

The emulsion stability test employed in the above example is a modification of the test described in Military Specifications I-11425 and I-10917 (QMC).

Example 2

Ethylene oxide in gaseous form was passed into nonylphenol and condensed therewith until the resulting condensation product contained an average of 6.82 ethenoxy groups per mol of alkylphenol. 6.95 g. of this product was dissolved in 43 ml. of standard JP-4 jet fuel forming a concentrate of emulsifier and hydrocarbon. 18 ml. of the concentrated hydrocarbon solution so prepared was mixed by stirring with 82 ml. of water of zero hardness. It was poured into a Nessler tube and observed over a period of 20 hours. At the end of this time no separation of phases had occurred.

An additional 18 ml. of the hydrocarbon emulsifier concentrate prepared as above was stirred into 82 ml. of water having a hardness of 1,000 p.p.m. until an emulsion was formed. The resulting emulsion was also observed over a period of 20 hours. At the end of this time no observable separation of phases had occurred.

The emulsion stability value referred to herein is the percentage of the original volume of emulsion remaining as emulsion after standing for 24 hours. To obtain the volume of emulsion remaining after 20 hours the volume of cream, oil and water separated are deducted from the original volume and the difference is expressed in percentage.

The stability of the emulsion is dependent upon the amount of emulsifier employed. Emulsions which are to be maintained in storage for 20 hours or more prior to use require a somewhat larger amount of emulsifier than those which are to be used within a shorter length of time.

An emulsion is prepared using conventional stirring procedures, no special equipment such as homogenizers or colloid mills being required. All that is necessary is to stir the hydrocarbon emulsifier and water together by means of a conventional propeller type stirrer.

What I claim is:

1. An emulsified motor fuel consisting essentially of a motor fuel hydrocarbon fraction and water and containing from 0.5% to 5.0% by weight of an emulsifier, said emulsifier comprising an alkylphenol ethenoxy product in which the alkyl radical contains from 8 to 15 carbon atoms and the condensation product contains on the average 6 to 9 ethenoxy ($-C_2H_4O-$) groups.

2. An emulsified motor fuel consisting essentially of a motor fuel hydrocarbon fraction and water and which contains from 1% to 2.5% by weight of an emulsifier, said emulsifier comprising an alkylphenol ethenoxy product in which the alkyl radical contains from 8 to 15 carbon atoms and the condensation product contains on the average from 6 to 9 ethenoxy ($-C_2H_4O-$) groups.

3. An emulsified motor fuel consisting essentially of a motor fuel hydrocarbon fraction and water which contains between 0.5% to 5.0% by weight of an emulsifier, said emulsifier comprising a dodecylphenol ethenoxy product which contains on the average 7.2 ethenoxy groups per dodecylphenol radical.

4. An emulsified motor fuel consisting essentially of a motor fuel hydrocarbon fraction and water which contains between 0.5% and 5.0% by weight of an emulsifier, said emulsifier comprising nonylphenol ethenoxy product which contains on the average 6.82 ethenoxy groups per nonylphenol radical.

References Cited in the file of this patent

UNITED STATES PATENTS

| | | |
|---|---|---|
| 2,111,100 | Kokatnur | Mar. 15, 1938 |
| 2,213,477 | Steindorff et al. | Sept. 3, 1940 |